United States Patent Office 3,079,949
Patented Mar. 5, 1963

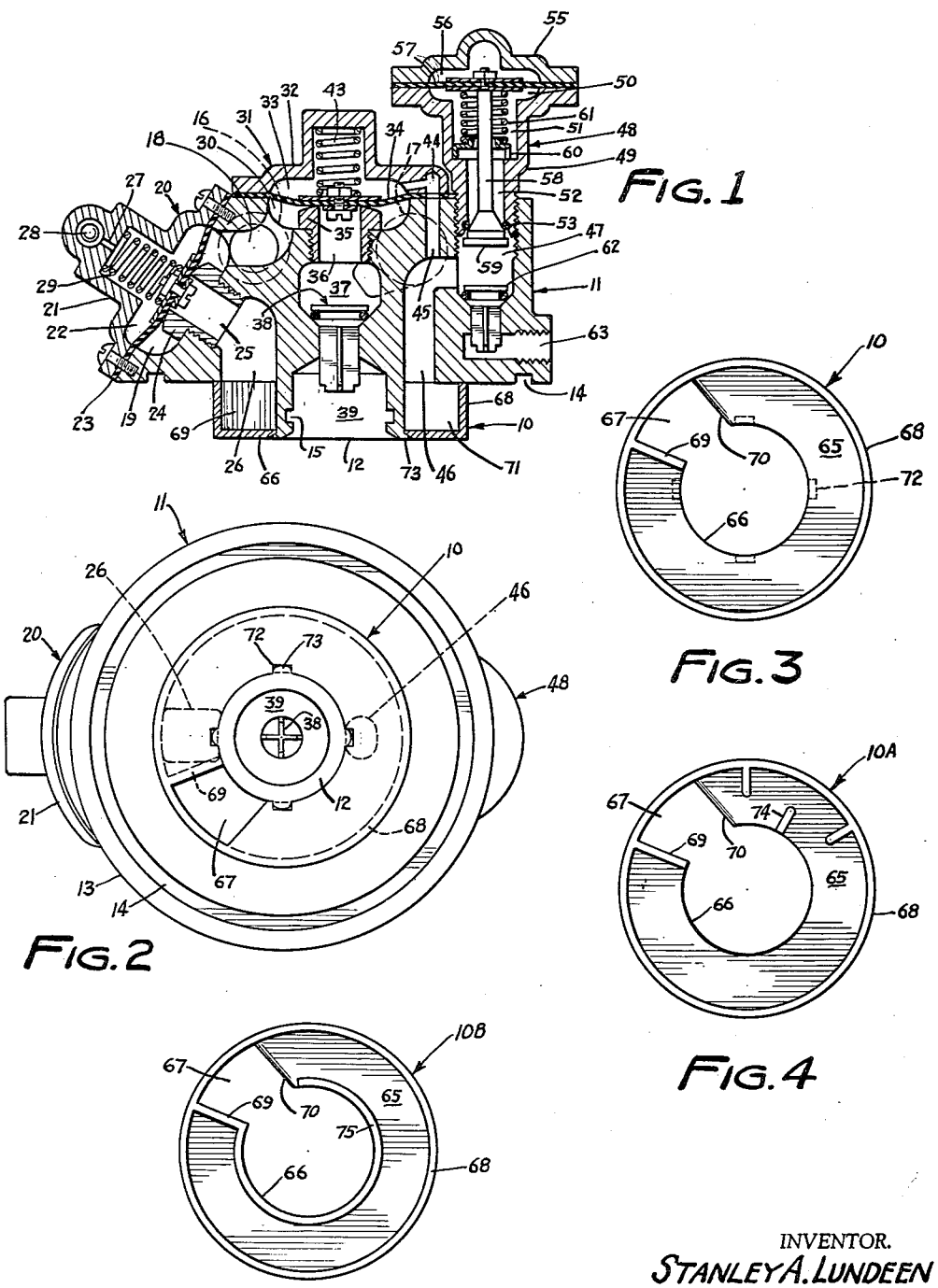

3,079,949
WATER SOFTENER CONTROL VALVE
AND BAFFLE
Stanley A. Lundeen, 2946 Stinson Blvd.,
Minneapolis 18, Minn.
Filed Mar. 23, 1960, Ser. No. 17,038
5 Claims. (Cl. 137—599.1)

This invention relates to a baffle means for use in a water softening system. More particularly, this invention relates to a baffle means for use in conjunction with the control valve means of an automatic water softening system.

The principal object of this invention is to provide baffle means between the bed of water softening mineral and the drain outlet of the control valve of a water softening system to eliminate loss of water softening mineral through the drain valve during regeneration of the softening mineral and for imparting a circular or spiral flow to incoming hard water introduced to the water softening tank of a water softening system.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which:

FIGURE 1 is a vertical section through an exemplary control valve for an automatic water softening system having the baffle means of this invention secured thereto;

FIGURE 2 is a bottom plan view of the baffle means and control valve of FIGURE 1;

FIGURE 3 is a top plan view of the baffle means per se;

FIGURE 4 is a top plan view of a modified form of baffle means;

FIGURE 5 is a top plan view of a further modified baffle means; and

Figure 6:
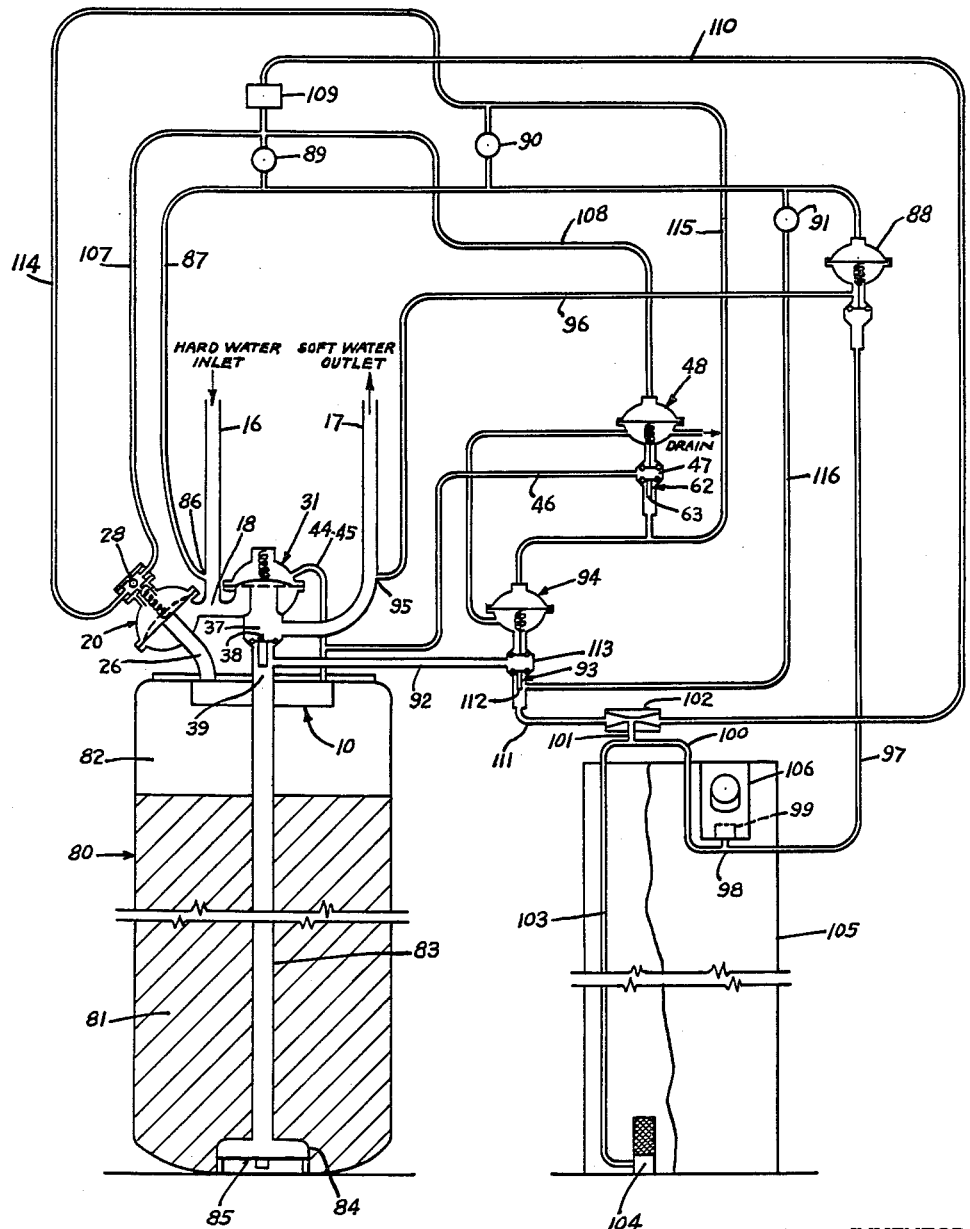
FIGURE 6 is a schematic representation of the elements of a control valve means with which the baffle of the present invention may be utilized, shown in conjunction with other elements of an automatic water softening system operatively connected to control a three phase regeneration cycle.

Referring to the drawings, the baffle means is indicated generally at 10. The baffle means 10 is shown in combination with the control valve means 11 of a water softening system mounted on and secured to a central annular projecting collar or boss 12 extending from the bottom face of the control valve means. The exemplary form of valve means illustrated is the subject matter of my co-pending application Serial No. 716,151. The present invention will be described with particular reference to its use in combination with the valve means of my co-pending application, but it is to be understood that the baffle means of the present invention is of general utility in combination with other similar water softener control valves.

The control valve 11 includes a base flange 13 adapted to be secured to the open end of the mineral tank of a water softening system. The bottom surface of the flange 13 is provided with an annular groove 14 adapted to receive a resilient O-ring or other gasket means to form a seal to prevent leakage between the top of the water softening tank and the bottom of the valve body. Suitable fastening means are provided for securing the valve means to the mineral tank. The annular collar or boss 12 projecting from the bottom of the valve body and supporting the baffle means 10 is adapted to receive the upper end of a pipe or tube connecting the control valve means with the bottom of the mineral tank and thus functions as a soft water inlet to the control valve. The inner surface of the boss 12 is provided with an annular groove 15 adapted to receive a resilient O-ring to frictionally engage the end of the tube inserted in the annular opening and to prevent leakage around that tube.

The control valve means is provided with a hard water inlet port 16 adapted to be connected by means of conventional plumbing connections and fittings to any domestic or commercial water distribution system supplying hard water. The control valve means is also provided with a soft water outlet port 17 adapted to be connected by means of conventional plumbing fittings to any commercial or domestic water distribution system for supplying soft water to the taps and faucets of that system. Hard water inlet 16 communicates directly with a chamber 18 integrally formed in the body of the valve means. Chamber 18 also communicates directly with a lower pressure chamber 19 of a first pressure controlled diaphragm valve, indicated generally at 20.

A cap 21 provided with a shallow bowl-shaped depression 22 which acts as an upper pressure chamber in the completed diaphragm valve is adapted to be secured over the lower pressure chamber 19 by means of screws or bolts or equivalent fastening means. A resilient diaphragm 23 is fitted between opposed faces of the cap 21 and the portion of the control valve body surrounding the lower pressure chamber 19. The lower pressure chamber 19 is provided with a central annular valve seat fitting 24 whose central channel 25 communicates directly with a hard water outlet port 26 leading to the top of the mineral water softening tank through the baffle means 10.

When the water pressure in the lower pressure chamber 19 exceeds the total pressure in the upper pressure chamber 22, the diaphragm valve 20 is opened and permits flow of hard water from the hard water inlet 16 through the chamber 18 through the lower pressure chamber 19 and thence through channel 25 to the outlet port 26 to the baffle means and thence to the water softening bed. Means are provided in the cap 21 for interrupting this normal flow during regeneration of the mineral water softening bed by applying increased pressure on the upper side of the resilient diaphragm 23 in the upper pressure chamber 22. These means include a port 27 and ball valving member 28 for controlling flow of water to the chamber 22 to assist spring 29 to force the diaphragm 23 against the valve fitting 24 to shut off the normal flow of incoming hard water during a regeneration cycle.

The entry chamber 18 from the hard water inlet 16 also communicates directly with the lower pressure chamber 30 of a second pressure controlled diaphragm valve, indicated generally at 31. The lower pressure chamber 30 is in the form of a shallow depression formed integrally with the control valve body. A cap 32 is adapted to be fitted over the lower pressure chamber 30 and secured by suitable fastening elements. The cap 32 is provided with a shallow bowl-shaped depression 33 which serves as an upper pressure chamber in the assembled valve. A resilient diaphragm 34 is fitted between the opposed faces of the control valve body surrounding the lower pressure chamber 30 and cap 32 so that when the cap is secured in place on the control valve body, a fluid-tight seal is formed. An annular valve seat 35 is fitted into a central opening in the bottom wall of the lower pressure chamber 30 of the second diaphragm valve 31.

Central channel 36 through the valve seat element 35 communicates directly with an interior chamber 37 in the control valve body. A one-way check valve element 38 seats in an opening in the bottom wall of chamber 37 which communicates with the chamber 39 contained within the boss 12 in the bottom of the control valve body. The check valve element 38 prevents flow from chamber 37 to chamber 39 when the water pressure in chamber 37 is greater than that in chamber 39, but permits flow in the opposite direction when pressure in chamber 39 is greater than that in chamber 37. The check valve comprises a flat disc having a peripheral annular groove fitted with a resilient O-ring and provided with a depending pilot stem formed from two identical slotted sheet metal pieces fitted together at right angles to one another in their respective slots and soldered or similarly secured to the bottom surface of the disc.

Soft water outlet 17 communicates directly with chamber 37. So long as the pressure in the upper pressure chamber 33 is greater than that in lower pressure chamber 30, as is true during the normal water softening cycle of a water softening system, the resilient diaphragm 34 is held in place against the valve seat 35 and the second diaphragm valve 31 is closed. Thus, during the normal water softening cycle, soft water from the mineral water softening bed enters chamber 39 from the tube held in the boss 12 and lifts the check valve elements 38 so that soft water may flow into the chamber 37 and out through the soft water outlet 17. On the other hand, when pressure is greater in lower pressure chamber 30 than in the upper pressure chamber 33, as is true during the regeneration cycle of the water softening system, then the resilient diaphragm is forced away from the valve seat 35 and the second diaphragm valve 31 is opened. Thus, during regeneration, hard water from the hard water inlet 16 is bypassed through chamber 18 into lower pressure chamber 30 through channel 36 to chamber 37 and soft water outlet 17. In this way, if any of the soft water taps connected to the water softening system are opened during the period that regeneration is taking place, fresh (but hard) water will be drawn from those taps.

A coil spring 43 normally urges the resilient diaphragm 34 against the valve seat 35 to maintain the diaphragm valve 31 in closed position. Fluid pressure is introduced into the upper pressure chamber 30 by means of a duct 44 in the rim of cap 32 through an opening adjacent to the edge of diaphragm 34 which in turn communicates with a duct 45 through the control valve body and drain channel 46. Drain channel 46 communicates directly with the top of the water softening tank through the baffle means. Thus, the full pressure of the top of the water softening tank, which is substantially the pressure of the hard water main, is maintained against the top of the resilient diaphragm 34 during the water softening cycle.

The drain channel 46 communicates directly with an interior chamber 47 in the control valve body. The upper portion of chamber 47 is tapped to receive the threaded body of a diaphragm drain valve, indicated generally at 48. The diaphragm drain valve 48 includes a threaded casing 49 provided with a shallow bowl-shaped interior depression 50 which serves as a lower pressure chamber for the drain valve. The valve casing 49 is provided with a central annular channel 51 which serves as an extension of the pressure chamber 50 and a somewhat narrower outlet channel or port 52 communicating with the chamber 47 in the control valve body. The lower end of the outlet port 52 is provided with an annular groove into which there is fitted a resilient O-ring 53. A port (not shown) in the wall of the drain valve casing communicates with pressure chamber 50 and discharges to a suitable sewer drain.

The diaphragm drain valve 48 includes a cap 55 provided with an interior shallow blow-shaped depression 56 which functions as an upper pressure chamber in the completed valve. A resilient diaphragm 57 is fitted between the opposed faces of the casing 49 and the cap 55.

Depending from the center of diaphragm 57 is a valving member including an elongated stem 58 at the end of which is a frusto-conical valve element adapted to seat within the resilient O-ring 53. An open three-footed spider or bridging member 60 rests in the bottom of the pressure chamber extension 51 and provides a seat for a coil spring 61 which normally urges the resilient diaphragm 57 upwardly so as to maintain the conical valving element 59 seated against the O-ring 53 so that, during the water softening cycle, the drain valve 48 is maintained closed. The function of the spider 60 is to permit free flow of water through the valve to the sewer drain when the valve is open.

Because of the pressure of coil spring 61, the diaphragm drain valve 48 will normally be closed. However, upon introduction of pressure to the upper pressure chamber 56 during a regenerating cycle through ports (not shown), sufficient pressure is exerted to overcome the pressure exerted by the coil spring and the plunger is moved so that the valve is opened and flow from the top of the water softener tank through the baffle means 10 into drain channel 46 and chamber 47 into the drain valve body and out to the sewer drain will be permitted. A one way check valve 62 is disposed in an opening in the bottom wall of chamber 47 connecting with an inlet port 63 to the control valve body. As described in my co-pending application, this port is utilized where it is desired to force brine twice through the softening bed of mineral material in the water softening tank. Where this double contact of the mineral with brine is not necessary, the check valve 62 may be removed and port 63 closed with a plug.

The baffle means 10 includes a generally flat and arcuate horizontal bottom wall portion 65 extending about a central opening 66. The bottom wall 65 extends only part of the way about the central opening 66. The spaced apart edges of the bottom wall 65 define an inlet-outlet port 67 for flow into and out from the baffle means. The bottom wall member 65 of the baffle means is provided at its outer edge with an upstanding vertical annular wall 68. Vertical wall 68 extends the entire distance around the outer edge of the bottom wall member 65 and the space defining the port 67. Bottom wall 65 extends between about 80 and 90 percent of the periphery of the outer wall, the remaining space enclosing port 67.

A wall 69 projects generally vertically upward from bottom wall 65 and inwardly from annular outer wall 68 adjacent one edge of port 67. Wall 69 is preferably vertical and radial although it may if desired be disposed obliquely extending over port 67. It may likewise be varied slightly from radial. Wall 69 is co-extensive in height with annular outer wall 68 and in the form shown extends radially inwardly to the periphery of the central opening 66.

The free edge surface 70 of the bottom wall member 65 at the opposite side of port 67 from radial wall 69 is preferably curved or beveled from the inner horizontal surface so as to minimize the flow-impeding effect of the edge surface at this point. The edge 70 also preferably does not lie on a radius of annular outer wall 68 or central opening 66, but instead is more nearly parallel with the radial wall 68. The effect of this is to widen the inner edge of port 67 adjacent the circular boss 12 when when the baffle is in place on the bottom of a control valve means. The edge 70 is desirably inclined away from radial wall 69 at an angle between about 5 and 15 degrees from the radius line.

The baffle means 10 is fitted to the control valve body against the bottom face thereof. The central opening 66 fits with a slide fit about the boss 12 of the valve body and the top edges of the annular outer wall 68 and wall 69 butt against the bottom face of the valve body. The baffle means is disposed so that the hard water outlet port 26 of the valve means lies immediately above the portion of the bottom wall 65 which is separated from port 67 by means of the wall 69. Thus, incoming hard water flowing through the valve means and out through the outlet port 26 enters the baffle means and flows through the annular chamber 71 defined by the outer periphery of the boss 12, the inner periphery of annular wall 68, the bottom face of the valve body and the top surface of bottom wall 65. The incoming hard water is thus forced to flow in a circuitous path more than ¾ of the distance about the baffle means before it is discharged into the water softening tank through port 67. In its course of travel through the annular chamber, a rotating or swirling motion is imparted to the water flow which is retained after the incoming hard water flow enters the water softening tank before becoming dissipated in the free board of the tank. The result is that the incoming hard water does not disturb the top surface of the bed of water softening minerals by gouging a depression in that surface as is often the case when the hard water enters as a vertical jet.

As best seen in FIGURE 2, drain channel 46 is positioned in the bottom of the control valve body diametrically opposite from the hard water outlet. Thus, during the regeneration cycle, when brine is forced upwardly through the bed of water softening mineral in the water softening tank and discharged to a sewer, the flow of brine is upwardly through the water softening tank into port 67 of the baffle means. It must then travel about ⅓ of the length of annular chamber 71 before escaping through drain channel 46 and out through the drain valve to the sewer. Because of the circuitous path which the brine must travel, any particles of water softening mineral carried along with the brine tend to fall by the wayside and be left behind instead of being carried through to the sewer and lost from the water softening tank.

As a means of preventing loss of water softening mineral from the water softening tank, the baffle of this invention has been found to be superior to screen means conventionally used for this purpose. Screens tend to become clogged and impede the flow of brine and water therethrough. Because the water softening mineral has a specific gravity in excess of that of brine, its normal movement is to sink rather than to rise in brine. Because of this, minimum impedence to any mineral particles caught up in the brine flow is sufficient to retard the movement of the mineral particles and cause them to drop back to the mineral bed in the water softening tank.

The baffle means of this invention performs two seprate functions. During the normal water softening cycle, it imparts a circular rotary movement to the inflowing hard water into the water softening tank and thus prevents disturbance of the mineral bed in the tank by the inflowing hard water. During the regeneration cycle the baffle means provides minimum obstruction to the flow of brine and rinse water from the water softening tank to the drain sewer sufficient to prevent outflow of particles of water softening mineral from the water softening tank, but without materially retarding the outflow of brine and rinse water to the drain.

In order to secure the baffle means in place on the control valve body and to prevent rotation of the baffle means with respect to the control valve, hard water port and drain channel, there is provided a plurality of notches 72 formed in the outside surface of the bottom wall member 65 adjacent the periphery of central opening 66. The baffle means is fit against the bottom surface of the control valve body around the boss 12 and rotated until it is in proper position with the hard water port just inside of the radial wall 69 away from port 67. The baffle means is then locked in this position by swaging or peening the metal of the boss 12 into the notches 72. The swaging or peening forms ears or tabs 73 of the valve body metal which fit into the beveled notches and secure the baffle means with the upper edge of the outer annular wall 68 tightly abutting against the bottom surface of the control valve body and keying the baffle means against rotation.

The brass or bronze of which the valve body is formed is easily worked to form the locking tabs.

In FIGURE 4 there is shown a modified form of baffle means construction. This modification is designated generally as 10A. The baffle means 10A is provided with a plurality of vertical radial fins or vanes 74 extending inwardly from the annular outer wall 68 and outwardly from central opening 66. The fins or vanes 74 are positioned in the baffle means between port 67 and that portion of the baffle means which underlies the drain channel 46 when the baffle means is in place on the control valve body. Thus, the fins or vanes 74 lie in that approximately ⅓ portion of the annular channel of the baffle means beginning at the free beveled edge 70 of the bottom wall member 65. The fins 74 desirably extend vertically coextensive with the outer wall 68 and radially inwardly to a distance equal to about ⅓ to ⅔ the width of the annular channel 71.

The fins 74 are intended to provide a more tortuous and circuitous path for the brine and rinse water flowing toward the drain, but without substantially impeding that flow. Thus, the radial extension of the fins may vary depending upon the overall cross-sectional area of the annular channel 71. The fins may extend inwardly a greater distance for larger channels and lesser distances for smaller channels.

In FIGURE 5 there is shown a further modified form of baffle means indicated generally at 10B. This modified from a baffle means is characterized by the provision of an inner annular wall 75 adjacent the central opening 66. Wall 75 extends vertically upwardly from the inner periphery of bottom wall member 65 adjacent the central opening 66. Wall 75 is preferably co-extensive in height with wall 68. Wall 75 imparts greater strength to the baffle means structure. It may be co-extensive with the inner edge of the bottom wall member 65 as shown in FIGURE 5, which imparts some resiliency to the inner wall; or, where greater rigidity is desired, the inner wall may be annular bridging the port 67. The inner wall structure 75 may be utilized in conjunction with fins 74 as shown in the embodiment of FIGURE 4 provided always that the cross-sectional area of the annular channel formed is adequate to permit relatively unimpeded flow therethrough.

The baffle means of this invention is desirably molded in one piece from a synthetic resinous material, such as high impact styrene, nylon, high density polyethylene, and the like. Since, in normal use, it is hidden from view, the transparency of the baffle means is of no import. However, for demonstration purposes in transparent models, it is desirably formed from a transparent material, such as acrylic resins, available under the trademark "Lucite." The baffle means may, of course, likewise be formed of metal, such as brass.

Referring now to FIGURE 6 of the drawings, the baffle means of this invention is shown schematically in combination with one exemplary form of control valve (which is the control valve of my copending application Serial No. 716,151) mounted on the top of an elongated and upright tank 80 adapted to contain a supply or bed 81 of a water softening ion exchange material, such as zeolite, to a level at about one-half to three-fourths of the tank's volumetric capacity to leave a freeboard area 82 at the top of the tank. Tank 80 is desirably formed of noncorrosive reinforced synthetic resinous material and is preferably provided with a rounded bottom.

The tank 80 is provided with a central tubular conduit 83 whose upper end is fitted into the projecting collar or boss 12 on the bottom of the control valve means to which the baffle 10 is fitted and is held in place by a resilient O-ring in the annular groove 15. Tube 83 is likewise preferably formed from a noncorrosive synthetic resinous material. The lower end of tube 83 terminates in a bell 84 supported by feet just off the surface of the bottom of the tank 80. A fine screen 85 stretched across the bottom of the inverted bell 84 prevents the ion exchange material in the tank from being drawn into the central vertical tube.

The control valve means is connected into a water distribution system with the hard water inlet 16 connected to a source of hard water and with the soft water outlet 17 connected on the discharge side of the distribution system. During the softening cycle, the pressures upon diaphragms in diaphragm valves 20 and 31 are such that the diaphragms assume the positions shown in broken lines in FIGURE 6. Diaphragm valve 20 is opened and diaphragm valve 31 is closed. During the softening cycle hard water enters through inlet 16 to chamber 18. Flow through diaphragm valve 31 is prevented because the greater pressure on the top of the diaphragm in that valve maintains the valve closed.

Port 86 is permanently opened so that the pressure of the hard water supply is maintained in line 87 to maintain pressure upon the top of the resilient diaphragm in the metering valve 88. The metering valve per se is the subject of my copending application Serial No. 676,777. Any flow of water from line 87 is prevented by solenoid actuated valves 89, 90 and 91, which remain closed during the water softening cycle. Because the pressure exerted by the hard water supply main on the lower side of the diaphragm in diaphragm valve 20 is greater than the pressure on the upper side of the diaphragm that valve remains open. Hard water may thus flow through valve 20 to chamber 26 and through the baffle 10 into the top of the water softening tank 80. The hard water is forced down through a bed of mineral 81 in the tank 80 and in the course of its passage becomes softened by ion exchange, as is well understood in the art. The resulting soft water enters the inverted bell at the bottom of the tank and is forced upwardly through tube 83 to the chamber 39 at the bottom of the control valve.

Outward flow from chamber 39 through channel 92 is prevented by virtue of check valve 93 and the fact that diaphragm valve 94 is maintained closed by spring pressure and by the water pressure of the tank against the plunger to hold it closed. The soft water being under pressure, may, however, lift check valve 38 and enter chamber 37. No soft water may flow through diaphragm valve 31 because that valve is closed. It is closed by virtue of the superior pressure applied from the top of the water softening tank through channel 46 and ducts 44 and 45, to the cap of the diaphragm valve 31, supplemented by spring pressure. No hard water may escape through channel 46 because of check valve 62 and the fact that diaphragm valve 48 is maintained closed by spring pressure and by the water pressure of the tank against the plunger.

Upon the opening of any tap or faucet connected in the soft water distribution system, soft water may flow out through the soft water outlet 17. At the same time, soft water is permitted to flow through port 95 through a line 96 to a metering valve 88 in a predetermined fixed proportion to the amount of soft water drawn through the soft water outlet, in the manner described in detail in my aforesaid co-pending United States application, Serial No. 676,777. The soft water metered out by the metering valve 88 flows under pressure through a line 97 through a T-fitting 98 which is connected to the vacuum dash-pot 99 of a clock control unit of the type described in my copending United States application, Serial No. 693,481 filed October 30, 1957, and thence through a line 100 to a T-fitting 101 (which, in turn, is connected to the throat of a venturi tube 102), and thence through tubing 103 to a salt strainer device 104 at the bottom of a brine generating tank 105 where it contacts stored salt to generate a brine solution for use in regeneration of the mineral water softening bed.

The construction of the salt strainer device 104 is described in detail in my co-pending United States application, Serial No. 743,066, filed June 19, 1958, now Patent No. 2,972,412, and a preferred form of brine generating vessel is described in my co-pending United States application, Serial No. 709,055, filed January 15, 1958, now Patent No. 2,985,514. Thus, in the operation of the water softening system to soften water, soft water is withdrawn from the distribution system for use as needed and this is furnished by passage of hard water through the system and out in the manner described. Simultaneously with the normal consumption of soft water a predetermined fixed small proportion of the soft water is by-passed to the brine generating vessel for preparation of a brine solution for use in revitalizing the mineral bed when necessary.

Regeneration may be carried out when determined to be necessary according to the volume of soft water consumed as reflected by the level of brine present in the brine generating vessel, as described in detail in my aforesaid co-pending United States application, Serial No. 693,481. Alternatively, in some installations, as, for example, where soft water consumption is fairly uniform, regeneration may be carried out at predetermined fixed intervals, such as every day, or every other day, or every third day or the like. In any event, regeneration preferably is carried out during periods of minimum soft water consumption, such as in the extreme early morning hours, as for example, 3:00 a.m.

The regeneration cycle is initiated by action of the control clock 106 operated by switch to energize a solenoid controlling valve 89. When this happens, the pressure of the hard water supply main is exerted through the hard water inlet 16 upon chamber 18 and through port 86 and line 87 upon the valve 89. Since this valve is now open, the water at main pressure is permitted to flow through the valve for distribution as follows.

When valve 89 is opened, the pressure of the hard water supply line is exerted through line 107 upon one side of the two-way ball check valve element 28 and upon the upper side of the resilient diaphragm of the diaphragm valve 20. This pressure, plus auxiliary spring pressure, forces the diaphragm against the valve seat in the solid line position shown in FIGURE 6 to close valve 20. Pressure upon the ball 28 prevents outward flow from the opposite side of the channel of the two-way check valve.

When valve 89 is opened, the pressure of the hard water supply line is also exerted through line 108 upon the upper pressure chamber and diaphragm of diaphragm drain valve 48. The main pressure in the upper pressure chamber of diaphragm drain valve 48 is sufficient to overcome the pressure of the coil spring in that diaphragm valve and open that valve to chamber 47 so that water may then flow from chamber 47 and out through one of the ports below the diaphragm to a drain or sewer. A constant flow control device 109 is inserted between the valve 89 and line 110 to venturi tube 102 (or, more precisely, between lines 107 and 108 and line 110, as shown in FIGURE 6) in order to reduce the volume of the stream of water permitted to flow to the venturi tube.

Thus, with the first phase of the regeneration cycle initiated and solenoid controlled valve 89 open, the pressure of the hard water supply main is applied against the diaphragm of diaphragm valve 20 to maintain that valve closed, with the assistance of spring pressure. Hard water from chamber 18 is prevented from flowing to the top of the water softening tank relieving the top of the water softening tank from the supply main pressure and also thereby relieving the top of the diaphragm of diaphragm valve 31 from that pressure. Accordingly, if any of the soft water taps are opened during the period of regeneration, hard water may now flow from the chamber 18 through the open diaphragm valve 31 to the chamber 37. Check valve 38 prevents flow of this hard water into chamber 39 and tube 83. The hard water may, however, flow out through the soft water outlet 17 and in this manner, hard water is by-passed during the regeneration cycle. If any water is drawn from the soft water taps during regeneration, a predetermined small proportion of this water will flow through port 95 to be metered by metering valve 88 into the brine generating vessel. This flow, however, will be negligible since normally no water will be drawn from the water distribution system during the regeneration cycle.

After initiation of the regeneration cycle the water flow released by opening of valve 89 maintains pressure upon the diaphragms of diaphragm valve 20 and diaphragm drain valve 48 in the manner described. The reduced flow through the flow control device 109 and line 110 to the venturi tube 102 passes through a line 111 and through port 112 to the control valve means lifting check valve 93 and passing through channel 92 to chamber 39. Diaphragm drain valve 94 remains closed, during this first phase of the regeneration cycle. As the water from line 110 flows through the restricted throat of the venturi tube 102 it creates a reduced pressure within the throat which draws the brine from the bottom of the tank 105 through the salt strainer unit 104 and up through the tubing 103 and through the venturi tube for passage through line 111 and past check valve 93 into chamber 113 and channel 92 to chamber 39 at the bottom of the control valve means and at the top of tube 83 in the water softening tank.

Chamber 37 in the control valve means is at the pressure of the hard water supply main. This insures that check valve 38 remains in place. The brine solution is thus forced down through tubing 83 to the bottom of the bed 81 of mineral water softening material and is distributed on the bottom of the tank and forced upwardly through the mineral bed in ion exchanging relationship. The brine solution rises through the mineral bed to the freeboard 82 of the tank pushing the fresh water in the freeboard of the tank ahead of it and out through baffle means 10 and channel 46 to chamber 47. Since the pressure upon the diaphragm in diaphragm drain valve 48 now holds that valve open, the water forced from the water softening tank passes through the drain valve 48 to a drain or sewer. Flow from chamber 47 is otherwise prevented by check valve 62.

After all of the brine in the brine generating tank has been withdrawn through the tube 103, the float valving element seats in the resilient valve seat of the salt strainer unit 104 and creates a suction within tubing 103 which, in turn, transmits itself through line 100 and fitting 98 to the vacuum dash-pot 99 on the control clock. The vacuum exerted upon the dash-pot 99 of the control clock introduces a time delay of sufficient length to permit substantially all of the brine solution to pass through the mineral bed to the freeboard of the tank 80.

At the expiration of this delay period the clock control actuates microswitches which de-energize the solenoid controlling valve 89 and energize the solenoid controlling valve 90. When this occurs, pressure is relieved upon diaphragm drain valve 48 causing that valve to close. At the same time, pressure is relieved upon one side of the two-way ball check valving element 28 and would relieve pressure upon the diaphragm in diaphragm valve 62 except that, with solenoid controlled valve 90 now opened, the pressure of the hard water supply line is asserted through valve 90 and line 114 upon the opposite side of the ball 28 to maintain the pressure upon diaphragm valve 20. The pressure of the hard water supply main is also asserted through valve 90 and line 115 on the top of the diaphragm of diaphragm drain valve 94. At the same time, water from line 115 passes under pressure through port 63 (lifting check valve 62) and passes through channel 46 into the top of the water softening tank 80.

This inflow of fresh water to the top of the water softening tank forces the brine left in the freeboard of the tank back down through the mineral bed in the opposite direction and up through the central tube 83 so that the brine solution passes through the mineral bed twice, once in each direction. This dual upflow and downflow contact of the brine with the mineral water softening material thus provides double the contact time between the brine and mineral facilitating and insuring complete revitalization of the mineral.

The brine solution forced upward through the central tube 83 into chamber 39 passes through channel 92 to chamber 113. Outflow from chamber 113 through port 112 is prevented by check valve 93. However, since diaphragm drain valve 94 is now pressurized, that drain valve is open and the brine solution passes through that valve and through the lower bowl of drain valve 48 to the drain or sewer. The flow of fresh water through solenoid actuated valve 90 is continued for a time period predetermined by the setting of the control clock sufficient to insure removal of all of the brine from the mineral bed and to thoroughly rinse the mineral with fresh water.

At the end of this second phase of the regeneration cycle, the clock control actuates microswitches to de-energize the solenoid controlling valve 90 and to energize the solenoids controlling valves 89 and 91. When this occurs, diaphragm drain valve 94 is again closed, diaphragm drain valve 48 is again opened and diaphragm valve 20 remains pressurized, but from line 107, instead of line 114, because of the shift in position of the two-way ball check 28. Fresh water is injected from valve 89 into port 112 and through tube 83 to the bottom of the mineral bed, in the manner heretofore described for the introduction of the brine, but because of the relatively low volume of this flow, it is supplemented by a further flow through valve 91 and line 116 to port 112. This larger volume supplemental flow flushes and rinses the mineral bed in its upflow passage to remove any traces of brine or other contaminate which may remain after the previous downflow rinsing.

This third phase of the regeneration cycle is allowed to continue for a time sufficient to insure complete washing of the mineral bed. At the end of this period, the control device deenergizes all of the solenoids so that valves 89 and 91 are then closed and the system is returned to its normal water softening function. This means that diaphragm valve 20 is depressurized, diaphragm valve 31 is pressurized, and diaphragm valves 48 and 94 are both depressurized, but maintained closed by spring action. With the system returned to its normal condition, the next water softening cycle is initiated.

The system described is but one in which the baffle means of this invention may be used. By simple modification of its structure, the control valve of the system and the baffle may be utilized in other water softening systems. One example of such a system which is somewhat simpler than that described in detail with reference to FIGURE 6 is one having a two phase regeneration cycle in which the second passage of the brine solution in contact with the mineral bed is dispensed with. This introduces a number of simplifications into the system. As an example, the second diaphragm drain valve 94 may be eliminated and a threaded opening in the top of chamber 113 may simply be fitted with a solid plug. At the same time, check valve 62 is no longer necessary and port 63 may be plugged. The diaphragm valve 20 may simply be pressurized by the line 107 alone so that the two-way check valve in the diaphragm valve 20 may be eliminated. Solenoid controlled valve 90 is no longer necessary.

Since the second flow of the brine solution in contact with the mineral bed has been eliminated, there is no need for the time delay in initiating the second stage of the regeneration cycle and the vacuum dash-pot 99 on the control clock along with the switches controlled by the dash-pot are no longer necessary. It will be apparent that other arrangements may be made whereby the number and sequence of phases in the regeneration cycle may be varied at will, along with the direction of flows during each of the phases. The control valve is versatile and adaptable to meet the operating demands of virtually any water softening system and the baffle functions similar in each such system.

It is apparent that many modifications and variations of this invention as hereinbefore set forth may be made without departing from the spirit and scope thereof. The specific embodiments described are given by way of example only and the invention is limited only by the terms of the appended claims.

I claim:

1. In combination, a control valve means for an automatic water softening system, said valve being connected to a water softener tank forming part of such a system and comprising a hard water outlet port to said water softener tank, a soft water inlet port from said water softener tank and a drain channel from said water softener tank, the soft water inlet port being a central channel in an annular collar projecting from the bottom surface of said control valve means, said hard water outlet port and drain channel being disposed on opposite sides of said projecting annular collar; and a baffle means disposed against the bottom surface of said control valve means, said baffles means comprising an annular vertical outer wall, the top edge of which abuts against the bottom surface of said control valve means, an arcuate horizontal bottom wall disposed within the periphery of said outer wall spaced from the bottom of the control valve means, a central opening in said bottom wall fit with a slide fit about the outer periphery of said annular collar enclosing said soft water inlet port, said bottom wall extending around between about 80 and 90 percent of the inner periphery of said outer wall, the space between the opposed edges of said bottom wall defining a port communicating with the annular channel defined by the bottom surface of the control valve means, the bottom wall of the baffle means, the inner periphery of said annular vertical outer wall and the outer periphery of said projecting annular collar, a barrier wall extending upwardly from one edge of said bottom wall adjacent one side of said last named port, said barrier wall being co-extensive in width with said arcuate bottom wall and co-extensive in height with said annular outer wall, said baffle means being secured to said control valve means so positioned as to enclose said hard water outlet port and said drain channel and so that the barrier wall lies between the hard water and outlet port and said port from said baffle means whereby incoming hard water follows a circuitous course from said hard water outlet to said port from the baffle means.

2. A water softener baffle in combination according to claim 1 further characterized in that said barrier wall is vertical and generally radial.

3. A water softener baffle in combination according to claim 1 further characterized in that the edge of said bottom wall adjacent said port opposite from said barrier wall is beveled and is inclined inwardly in the horizontal plane at an angle between about 5 and 15 degrees from a radius line.

4. A water softener baffle in combination according to claim 1 further characterized in that the outside bottom surface of said bottom wall is provided with a plurality of notches adjacent said central opening to facilitate secure attachment of said baffle to a water softener control valve body.

5. A water softener baffle in combination according to claim 1 further characterized by being formed in one integral piece of rustproof and corrosion-resistant synthetic resinous material.

References Cited in the file of this patent
UNITED STATES PATENTS
2,620,299   Deters et al. _____ Dec. 2, 1952

UNITED STATES PATENT OFFICE
CERTIFICATE OF CORRECTION

Patent No. 3,079,949            March 5, 1963

Stanley A. Lundeen

It is hereby certified that error appears in the above numbered patent requiring correction and that the said Letters Patent should read as corrected below.

Column 2, line 40, for "inlent" read -- inlet --; column 3, line 25, for "elements" read -- element --; column 6, line 29, for "from a" read -- form of --; column 11, line 22, for "baffles" read -- baffle --; column 12, line 9, strike out "and".

Signed and sealed this 24th day of September 1963.

(SEAL)
Attest:

ERNEST W. SWIDER
Attesting Officer

DAVID L. LADD
Commissioner of Patents